United States Patent [19]

Wootton

[11] 4,343,964
[45] Aug. 10, 1982

[54] ADHESIVE COATED ELECTRICAL APPARATUS HAVING SUBLIMABLE PROTECTIVE COVERING AND AN ASSEMBLY METHOD

[75] Inventor: Roy E. Wootton, Murrysville, Pa.

[73] Assignee: The United States of America as represented by the United States Department of Energy, Washington, D.C.

[21] Appl. No.: 226,330

[22] Filed: Jan. 19, 1981

[51] Int. Cl.$^3$ .................. H01B 9/06; H01B 9/04; H02G 1/00; H02G 5/06
[52] U.S. Cl. ...................... 174/10; 29/424; 29/828; 134/4; 156/48; 156/155; 174/14 R; 174/28; 427/154; 428/40
[58] Field of Search .................. 174/10, 14 R, 16 B, 174/17 GF, 24, 27, 28, 29, 99 R, 99 B; 307/147; 361/233; 29/424, 825, 828, 868; 156/47, 48, 155; 134/1, 4, 42; 260/706; 427/154-156; 428/40, 543, 913

[56] References Cited

U.S. PATENT DOCUMENTS

| | | | |
|---|---|---|---|
| 2,113,764 | 4/1938 | Macht | 156/155 X |
| 3,515,939 | 6/1970 | Trump | 174/14 R X |
| 3,553,410 | 1/1971 | Morva | 174/14 R X |
| 3,911,937 | 10/1975 | Sletten et al. | 134/4 X |
| 4,084,064 | 4/1978 | Bowman | 174/14 R |
| 4,160,870 | 7/1979 | Artbauer | 174/14 R |

*Primary Examiner*—Laramie E. Askin
*Attorney, Agent, or Firm*—M. S. Yatsko

[57] ABSTRACT

Electrical apparatus including an enclosure, an electrode disposed within the enclosure, and supports for insulatably supporting the electrode within the enclosure has a permanently sticky adhesive material which is disposed on the interior surface of the outer enclosure. A high-vapor-pressure sublimable material is disposed on the permanently sticky adhesive material, with the sublimable material capable of subliming away in the presence of a vacuum. The presence of the sublimable material enables the apparatus to be non-sticky during assembly and handling operations, while being rendered sticky upon commissioning of the apparatus.

13 Claims, 1 Drawing Figure

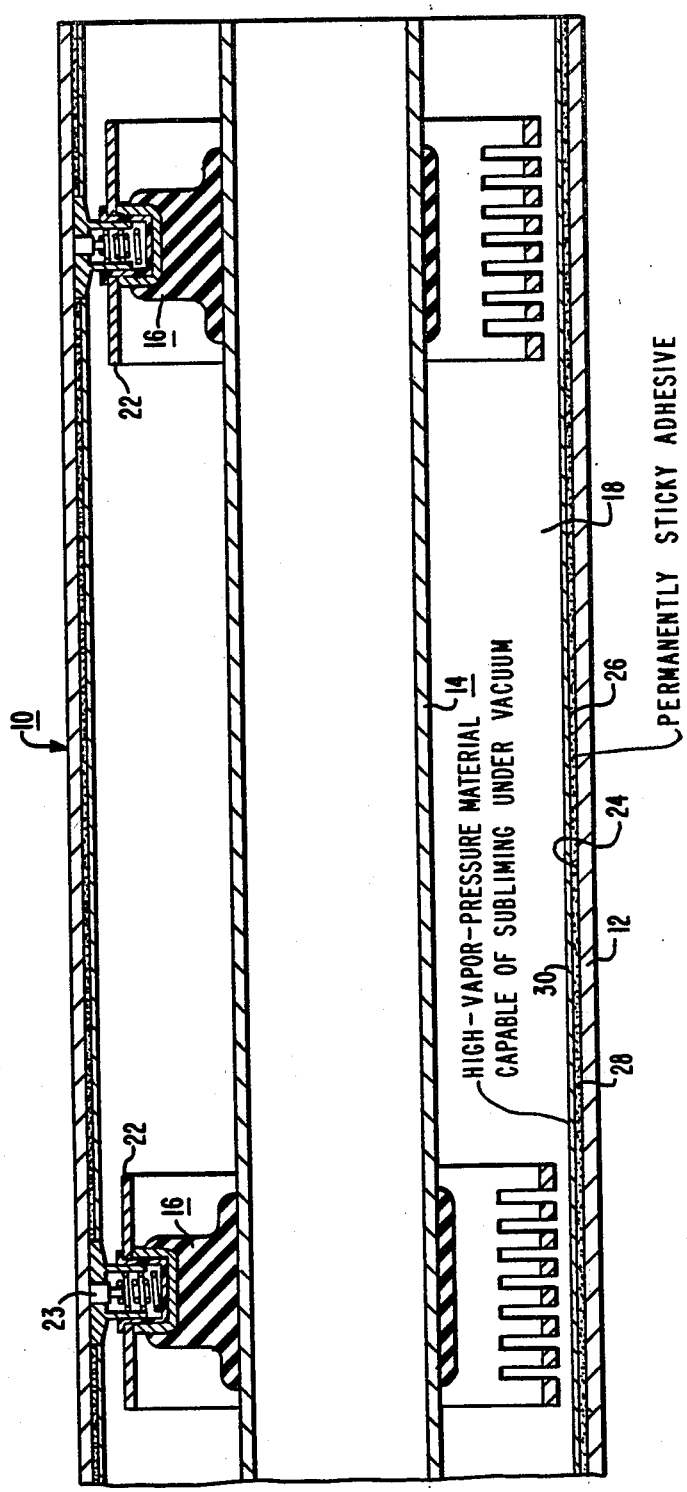

ADHESIVE COATED ELECTRICAL APPARATUS HAVING SUBLIMABLE PROTECTIVE COVERING AND AN ASSEMBLY METHOD

GOVERNMENT RIGHTS STATEMENT

The Government has rights in this invention pursuant to Contract No. ET-78-C-01-2870 awarded by the United States Department of Energy.

BACKGROUND OF THE INVENTION

This invention relates generally to electrical apparatus, and more particularly, to an improved particle trapping system in such electrical apparatus which utilizes a sublimable protective coating over an interiorly disposed permanently sticky adhesive material.

High-voltage gas-insulated electrical apparatus, typical of which are transmission lines, circuit breakers, disconnect switches and the like, typically comprise an outer sheath or enclosure at low or ground potential, an inner electrode or electrodes at high potential disposed within the outer enclosure, and support insulators for insulatably supporting the electrode within the enclosure. An insulating gas is generally utilized to electrically insulate the electrode from the outer enclosure, with the result that the high dielectric strength of the insulating gas enables closer, more compact spacings between the electrode and the enclosure. Sulfur hexafluoride has been utilized as the insulating gas for many reasons associated with its useful combination of vapor pressure, chemical stability, cost, electric strength, thermal conductivity, and non-toxicity, among other properties.

One problem which has arisen in the design of these high voltage gas-insulated electrical apparatus, and more particularly with respect to the transmission lines, is the effect of undesired mobile conducting or semiconducting particles. These particles may be remaining in the line after assembly, or may be produced during operation, and can traverse between the outer enclosure and the inner electrode to thereby cause sparking, corona, or can lead to flashovers and breakdown of the insulating gas or the insulating support. These contamination particles can lower the breakdown strength of the sulfur hexafluoride gas. In order to overcome these particle effects, it may be necessary to increase the size of the gas-insulated transmission line, or include within the transmission line means for eliminating or deactivating the conducting particles.

One means utilized in the prior art to deactivate these particles has been the use of low electric field regions as taught by Trump in U.S. Pat. No. 3,515,939. The low field regions are created by including within the transmission line conducting electrodes which are electrically connected to the outer sheath and which have portions thereof spaced therefrom, so that a low field region is formed between the electrode and the outer sheath known as particle traps.

Another method utilized in the prior art is the so-called adhesive trap, in which particles become trapped on the adhesive surface, preferably in a location where the electric field is low. This type of adhesive trap was disclosed in U.S. Pat. No. 3,911,937 to Sletten et al.

Adhesive traps may be permanently sticky, or may be initially non-sticky. The permanently sticky adhesive trap involves coating the interior surface of the outer electrode with an adhesive material which is permanently adhesive. (As used throughout this specification, permanently adhesive means that the adhesive material is sticky throughout its lifetime, as contrasted to other adhesives which may be non-sticky at times.) The non-permanently sticky adhesive traps generally involve a surface film which again is deposited on the interior surface of the outer enclosure, but involves the surface film which is not sticky when deposited and only becomes sticky after the system is filled with the insulating gas, typical of which is sulfur hexafluoride, containing a solvent or softener such as cyclohexane or cyclehexene. This approach has recently run into difficulties in that the electric strength of the insulating gas is adversely affected. The permanently sticky adhesive trap also has problems, in that since the material is always sticky, difficulties in handling, assembling of the equipment, and the like are present.

SUMMARY OF THE INVENTION

The above-mentioned disadvantages of the prior art are eliminated by this invention which provides electrical apparatus comprising an enclosure, an electrode disposed within and spaced apart from the enclosure, and means for insulatably supporting the electrode within the enclosure. A permanently sticky adhesive material is disposed on the interior surface of the enclosure, and a high-vapor-pressure material is disposed on the adhesive material. The high-vapor-pressure material is capable of subliming away under vacuum, while remaining solid at room temperatures at atmospheric pressure.

BRIEF DESCRIPTION OF THE DRAWINGS

Reference is now made to the description of the preferred embodiment, illustrated in the accompanying drawing, in which the sole FIGURE is a sectional view of a gas-insulated transmission line utilizing the teachings of this invention.

DESCRIPTION OF THE PREFERRED EMBODIMENT

Referring now to the sole FIGURE of the drawings, therein is illustrated a gas-insulated transmission line 10, typical of the electrical apparatus which may utilize the teachings of this invention. Other types of gas-insulated electrical apparatus in which the invention may be utilized are illustrated, for example, in U.S. Pat. No. 3,911,937. The transmission line 10 is comprised of an elongated, cylindrical outer sheath 12 at low or ground electrical potential, with an inner conductor or electrode 14 at high electric potential with respect to the outer sheath 12 disposed within the outer sheath 12. The inner conductor 14 would be at an electric potential of, for example, 121-1200 KV and both the outer sheath 12 and the inner conductor 14 would be constructed of a good electrically conducting material such as aluminum. An insulating gas 18, typical of which is sulfur hexafluoride at a pressure of 50 pounds per square inch gauge, is eventually disposed within the outer sheath 12 and electrically insulates the inner conductor 14 from the outer sheath 12. A plurality of insulating supports 16 are utilized for insulatably supporting the inner conductor within the outer sheath 12. If desired, an apertured electrode, or particle trapping ring 22, is disposed within the outer sheath 12 adjacent to, and secured to, the insulating support 16, and is electrically connected to the outer sheath 12 by means such as the contact button 23. A more detailed description of the electrical connection between the apertured electrode 22 and the outer sheath 12 can be found in U.S. Pat. No. 4,084,064.

Deposited on the interior surface 24 of the outer sheath 12 is a permanently sticky adhesive material 26. Although illustrated as being deposited over substantially all the interior surface 24 of the outer sheath 12, the permanently sticky adhesive material 26 can, if desired, be deposited only on selected portions of the interior surface 24 such as, for example, the area 28 of the outer sheath 12 opposite the particle trapping ring 22.

Covering the permanently sticky adhesive material 26 wherever it may be located is a thin film of a high-vapor-pressure material 30. This thin film cover material 30 is made as thin as possible while allowing the surface thereof to be non-sticky. The cover material 30 is of a high-vapor-pressure material capable of subliming away under vacuum, and more particularly, will be a material which will sublime away (that is, make a transition directly from solid phase into vapor phase) under a vacuum of not more than 1 Torr at a temperature of 0° C. Additionally, the cover material 30 will be a material which will remain solid at a temperature of 50° C. at atmospheric pressure. Two candidate materials which may be utilized as the cover material 30 are camphor and napthalene. Additionally, materials such as those listed below may also be utilized:

| FORMULA (—) | MELTING POINT (°C.) | VAPOR PRESSURE AT TEMPERATURE (mm) at (°C.) |
|---|---|---|
| $C_2H_3Cl_3O_2$ | 52 | 10 at 20 |
| $C_2H_3NS$ | 36 | 10 at 05 |
| $C_2H_5NO$ | 47 | 10 at 25 |
| $C_4H_{10}O$ | 25 | 40 at 25 |
| $C_6H_{12}O_3$ | 155 | 10 at 24 |
| $C_8H_{18}$ | 101 | 10 at 14 |

During commissioning of the transmission line 10, it is necessary, and always has been, to pump out the system to remove moisture and air. This usually involves a long period such as hours or days under vacuum. The transmission line 10 illustrated will, during this commissioning procedure, have the cover material 30 sublime away under this vacuum and then can be removed with the aid of a flow of dried gas through the system if desired. The permanently sticky adhesive material 26 under the cover material 30 will remain behind, thus providing an adhesive trap for any contamination particles within the transmission line 10 while providing for a non-sticky surface during handling, assembly, and initial installation of the transmission line 10.

The transmission line 10 can be assembled most preferably by depositing the permanently sticky adhesive material 26 on the interior surface 24 of the outer sheath 12, and then depositing the high-vapor-pressure sublimable cover material 30 on the permanently sticky adhesive material 26. The outer sheath 12, the inner conductor 14, and support means 16 are then assembled to form a transmission line 10, and the transmission line 10 is then transported to and installed in the field. A vacuum is then created in the outer sheath 12, causing the cover material 30 to sublime away, and then the insulating gas 18 is inserted into the outer sheath 12. As an option, a flow of dry gas can be circulated through the outer sheath 12 after the vacuum has been created in the outer sheath 12 but prior to the insertion of the insulating gas 18.

The transmission line and method according to this invention has numerous advantages over that described in the prior art. For example, the adhesive material 26 is permanently sticky after the transmission line 10 has been commissioned, and no additives are required to be in the permanently sticky adhesive film 26 after commissioning. No additives are required to be present in the insulating gas 18 after commissioning, and the adhesive trap, because of the presence of the cover material 30, presents a non-adhesive surface during assembly, cleaning and factory and field assembly. Furthermore, the transition from non-adhesive to adhesive condition is achieved by a vacuum process which is part of the present commissioning procedure, and which therefore does not represent any additional expense.

I claim:

1. Electrical apparatus in the form of a transmission line comprising:
   an outer sheath;
   an inner conductor disposed within and spaced apart from said outer sheath;
   means for insulatably supporting said inner conductor within said outer sheath;
   a permanently sticky adhesive material disposed on the interior surface of said outer sheath; and
   a high-vapor-pressure material disposed on said permanently sticky adhesive material, said high-vapor-pressure material capable of subliming away under vacuum.

2. The apparatus according to claim 1 wherein said permanently sticky adhesive material substantially completely covers the interior surface of said outer sheath.

3. Electrical apparatus comprising:
   an enclosure;
   an electrode disposed within and spaced apart from said enclosure;
   means for insulatably supporting said electrode within said enclosure;
   a permanently sticky adhesive material disposed on the interior surface of said enclosure; and
   a high-vapor-pressure material disposed on said permanently sticky adhesive material, said high-vapor-pressure material capable of subliming away under vacuum.

4. Apparatus according to claim 3 wherein said permanently sticky adhesive material substantially completely covers the interior surface of said enclosure.

5. Apparatus according to claims 1 or 3 wherein said high-vapor-pressure material will sublime under a vacuum of not more than 1 Torr at 0° C., and said high-vapor-pressure material will remain solid at a temperature of 50° C. at atmospheric pressure.

6. Apparatus according to claims 1 or 3 wherein said high-vapor-pressure material is selected from the group consisting of camphor, naphthalene, $C_2H_3Cl_3O_2$, $C_2H_3NS$, $C_2H_5NO$, $C_4H_{10}O$, $C_6H_{12}O_3$ or $C_8H_{18}$.

7. A method for assembling a gas-insulated transmission line of the type including an elongated outer sheath, an inner conductor disposed within and spaced apart from said outer sheath, and means for insulatably supporting said inner conductor within said outer sheath, comprising the steps of:
   depositing a permanently sticky adhesive material on the interior surface of an outer sheath;

depositing a high-vapor-pressure, sublimable cover material on said permanently sticky adhesive material;

assembling said outer sheath with an inner conductor and insulating support means to form a transmission line;

creating a vacuum within said outer sheath to sublime away said cover material; and inserting an insulating gas in said outer sheath.

8. The method according to claim 7 wherein the step of assembling said outer sheath, inner conductor and insulating support means occurs prior to the step of depositing a permanently sticky adhesive material.

9. The method according to claim 7 including a step of circulating a flow of dry gas through said outer sheath subsequent to the step of creating a vacuum and prior to the step of inserting an insulating gas.

10. A method for assembling electrical apparatus of the type including an enclosure and an electrode insulatably supported within said enclosure comprising:

depositing a permanently sticky adhesive material on the interior surface of an enclosure;

depositing a high-vapor-pressure, sublimable cover material on said permanently sticky adhesive material;

placing an electrode within said enclosure in insulated relationship with respect thereto;

creating a vacuum in said enclosure which vacuum sublimes away said cover material; and inserting an insulating gas in said enclosure.

11. The method according to claim 10 including a step of circulating a flow of dry gas through said enclosure subsequent to the step of creating a vacuum and prior to the step of inserting an insulating gas.

12. The method according to claims 7 or 10 wherein the step of depositing a cover material comprises depositing a cover material sublimable under a vacuum of not more than 1 Torr at 0° C., said cover material remaining solid at a temperature of 50° C. at atmospheric pressure.

13. The method according to claims 7 or 10 wherein the step of depositing a cover material comprises depositing a cover material selected from the group consisting of camphor, naphthalene, $C_2H_3Cl_3O_2$, $C_2H_3NS$, $C_2H_5NO$, $C_4H_{10}O$, $C_6H_{12}O_3$ or $C_8H_{18}$.

* * * * *